US010225670B2

(12) United States Patent
Feilner et al.

(10) Patent No.: US 10,225,670 B2
(45) Date of Patent: Mar. 5, 2019

(54) METHOD FOR OPERATING A HEARING SYSTEM AS WELL AS A HEARING SYSTEM

(71) Applicant: Sonova AG, Stafa (CH)

(72) Inventors: Manuela Feilner, Egg (CH); Michael Boretzki, Ruti (CH); Harald Krueger, Affoltern am Albis (CH)

(73) Assignee: SONOVA AG, Stäfa (CH)

( * ) Notice: Subject to any disclaimer, the term of this patent is extended or adjusted under 35 U.S.C. 154(b) by 3 days.

(21) Appl. No.: 15/510,310

(22) PCT Filed: Sep. 12, 2014

(86) PCT No.: PCT/EP2014/069523
§ 371 (c)(1),
(2) Date: Mar. 10, 2017

(87) PCT Pub. No.: WO2016/037664
PCT Pub. Date: Mar. 17, 2016

(65) Prior Publication Data
US 2017/0289712 A1    Oct. 5, 2017

(51) Int. Cl.
*H04R 25/00*    (2006.01)
*G10L 15/24*    (2013.01)
*G06K 9/00*    (2006.01)

(52) U.S. Cl.
CPC ....... *H04R 25/558* (2013.01); *G06K 9/00228* (2013.01); *G06K 9/00288* (2013.01);
(Continued)

(58) Field of Classification Search
CPC .... H04R 25/30; H04R 25/405; H04R 25/407; H04R 25/552; H04R 25/554;
(Continued)

(56) References Cited

U.S. PATENT DOCUMENTS 6,707,921 B2    3/2004  Moore
8,635,066 B2 *  1/2014  Morrison ........... G06K 9/00221
                                                  704/231
(Continued)

FOREIGN PATENT DOCUMENTS

DE    101 47 812 A1    4/2003
JP    2012-029209 A    2/2012
WO    2015/181727 A2   12/2015

OTHER PUBLICATIONS

Gibson, et al., "Multi-microphone Adaptive Array Augmented with Visual Cueing", Proceedings of the Annual International Conference of the IEEE Engineering in Medicine and Biology Society, EMBS-2012, Aug. 28, 2012, pp. 1000-1003.
(Continued)

*Primary Examiner* — Huyen D Le
(74) *Attorney, Agent, or Firm* — Pearne & Gordon LLP

(57) ABSTRACT

A method for operating a hearing system including a hearing device, a camera and an auxiliary device, the method including the steps of providing an input signal to the hearing device, capturing an image or a sequence of images of at least sections of a surrounding of a user wearing the hearing device, processing the image or the sequence of images in the auxiliary device) for obtaining consolidated data of a sound source being important for the user, transmitting the consolidated data to the hearing device, generating an output signal in the hearing device by processing the audio signal and by taking into account the consolidated data, and feeding the output signal to an output transducer of the hearing device. Thereby, a hearing system having improved capabilities is obtained.

14 Claims, 4 Drawing Sheets

(52) U.S. Cl.
CPC ............ *G10L 15/24* (2013.01); *H04R 25/407* (2013.01); *H04R 25/552* (2013.01); *H04R 25/405* (2013.01); *H04R 2225/43* (2013.01); *H04R 2225/55* (2013.01); *H04R 2430/20* (2013.01)

(58) Field of Classification Search
CPC .............. H04R 25/558; H04R 2225/43; H04R 2225/55; H04R 2430/20; G06K 9/00228
USPC ........ 381/23.1, 312, 313, 315, 327, 328, 91, 381/92, 381; 704/231, 251, 271
See application file for complete search history.

(56) References Cited

U.S. PATENT DOCUMENTS

| | | | |
|---|---|---|---|
| 9,549,264 B2 * | 1/2017 | Kim | ........................ H04R 25/30 |
| 2002/0103649 A1 | 8/2002 | Basson | |
| 2008/0260189 A1 | 10/2008 | Schobben | |
| 2010/0135500 A1 | 6/2010 | Derleth | |

OTHER PUBLICATIONS

International Search Report for PCT/EP2014/069523 dated May 22, 2015.
Written Opinion for PCT/EP2014/069523 dated May 22, 2015.

\* cited by examiner

METHOD FOR OPERATING A HEARING SYSTEM AS WELL AS A HEARING SYSTEM

TECHNICAL FIELD OF THE INVENTION

The present invention is related to a method for operating a hearing system with the aid of a camera as well as to a hearing system.

DESCRIPTION OF THE RELATED ART

One of the most important goals of a hearing system is to enhance the intelligibility of speech also in adverse listening conditions. A beam former is one of the functionalities, which improves the intelligibility of speech, when the speaker is in front of the hearing device user. But in many situations this is not the case.

It is difficult to analyse acoustically to which person the hearing device user wants to listen to, especially when several individuals are talking. There is no hearing system yet that enables the hearing device user to select the individual the user wants to listen to and that tracks the location of this individual such that the hearing device optimizes the intelligibility exactly to this location.

There are solutions that propose to use further sensors, especially image sensors, to improve the beam former of a hearing device. For example, the teaching U.S. Pat. No. 6,707,921 B1 discloses an image based solution to determine when a speaker is speaking. Furthermore, DE 10 147 812 B4 discloses a hearing system comprising a camera. The known hearing system may use image processing to determine a number of speakers, perform lip-reading and to control a beam former.

SUMMARY OF THE INVENTION

It is an object of the present invention to provide a method for operating a hearing system as well as a hearing system that are significantly improved with regard to the known solutions.

It is pointed out that the term "hearing device" covers a hearing aid—such as a BTE-(Behind-The-Ear), an ITE-(In-The-Ear), a CIC-(Completely-In-Channel) hearing device or the like—and also an implantable device that is used to improve the hearing of a hearing impaired person.

First, the present invention is directed to a method for operating a hearing system comprising a hearing device, a camera and an auxiliary device. The inventive method comprises the steps of:
  providing an input signal for said hearing device,
  capturing an image or a sequence of images of at least sections of a surrounding of a user wearing said hearing device,
  processing said image or said sequence of images in said auxiliary device for obtaining consolidated data of a sound source being important for said user,
  transmitting said consolidated data to the hearing device,
  generating an output signal in said hearing device by processing the input signal and by taking into account said consolidated data, and
  feeding said output signal to an output transducer of said hearing device.

The step of "providing an input signal for said hearing device" shall be understood as capturing an acoustic signal impinging on the input transducer of the hearing device. The input transducer comprises two or more microphones, for example. Two or more microphones are required if the hearing device shall have beam forming capabilities.

The present invention results in an improved intelligibility for the hearing system user while energy resources in the hearing device are maintained at the same time.

In an embodiment of the method according to the present invention, said processing comprises locating said sound source being of importance to said user and said consolidated data of a sound source comprises a directional angle being defined between a sagittal plane of said user and said sound source seen from said user.

The consolidated data is the result of the processing of the images or sequence of images and may very well be a single parameter as the angle defined between the sagittal plane of the user and the sound source seen from the user.

Further embodiments of the method according to the present invention further comprise the steps of:
  selecting said sound source being important to said user of said hearing device out of a plurality of sound sources, and
  tagging said sound source by activating an input on the auxiliary device.

Further embodiments of the method according to the present invention further comprise the step of tracking said sound source.

In further embodiments of the method according to the present invention, the auxiliary device is one of the following:
  a smartphone;
  a remote control.

In further embodiments of the method according to the present invention, said camera is positioned at the head of the user.

Further embodiments of the method according to the present invention further comprise the step of augmenting said consolidated data by information of a sensor unit, such as a compass or an additional microphone signal.

Further embodiments of the method according to the present invention further comprise the steps of:
  detecting a present position of said user relative to the camera, and
  calculating a direction in which said sound source being important for said user taking into account the present position of said user.

Further embodiments of the method according to the present invention further comprise the steps of:
  detecting a favorite speaker as said sound source by face recognition and comparison to a corresponding data base, and
  tracking said favorite speaker after a tracking command is received by said auxiliary device.

In further embodiments of the method according to the present invention, said input signal to the hearing device originate from at least one input transducer or from a streaming unit.

Furthermore, the present invention is directed to a hearing system comprising:
  a hearing device comprising an input transducer, an output transducer and a processing unit being operatively connected to the input transducer and the output transducer,
  at least one camera for capturing an image or a sequence of images of at least a section of a surrounding of a user wearing said hearing device, an auxiliary device receiving and processing said image or said sequence of images for obtaining consolidated data of a sound source being important for said user, and a transmission channel between said auxiliary device and said hearing device for transmitting said consolidated data to said hearing device, wherein said processing unit is adapted to take into account said consolidated data while generating an output signal for the output transducer.

Complexity of the image analysis requires high computing resources, which may not be available in a BTE-(Behind-The-Ear) or ITE-(In-The-Ear) hearing devices. Otherwise, image analysis would lead to an excessive use of battery power. Continuous streaming of image data would also require too much power.

In an embodiment of the hearing system according to the present invention, a low power technology is used for the transmission channel, such as Bluetooth standard or inductive coupling.

In further embodiments of the hearing system according to the present invention, the transmission channel is adapted to continuously transmit consolidated data from the auxiliary device to the hearing device.

In further embodiments of the hearing system according to the present invention, the auxiliary device is a smartphone or a remote control.

It is expressly pointed out that also all combinations of the above-mentioned embodiments are possible and herewith disclosed. Only those embodiments or combinations of embodiments are excluded that would result in a contradiction.

BRIEF DESCRIPTION OF THE DRAWINGS

The present invention is further described by referring to drawings showing exemplified embodiments of the present invention.

DETAILED DESCRIPTION OF THE INVENTION

Figure 1:
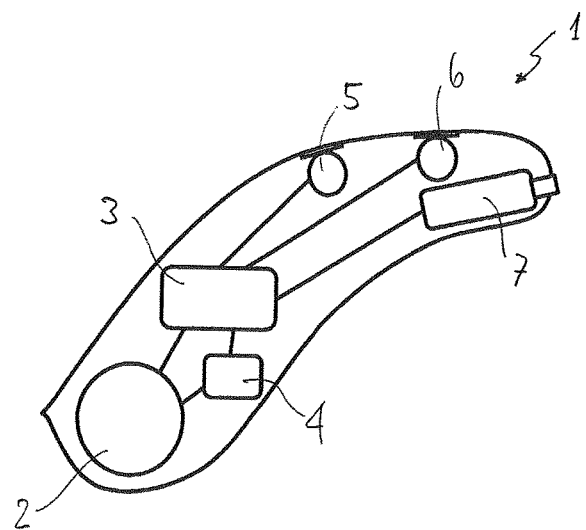
FIG. 1 schematically shows a known BTE-(Behind-The-Ear) hearing device with its main components, FIG. 2 schematically shows a side view of a head of a user wearing the hearing device of FIG. 1 and glasses with a camera.

FIG. 1 schematically shows a known BTE-(Behind-The-Ear) hearing device 1 with its main components comprising a battery 2, a processing unit 3, a wireless interface unit 4, a first input transducer 5, a second input transducer 6 and a receiver unit 7, to which a tube is connected (not shown in FIG. 1) to conduct sound generated by the receiver unit 7 to an ear of a hearing device user via an ear tip positioned in the ear canal, for example. The battery 2 is providing energy to the wireless interface unit 4 as well as to the processing unit 3, in which input signals of the first and second input transducers 5 and 6 are processed and in which an output signal is generated for the receiver unit 7.

Figure 2:
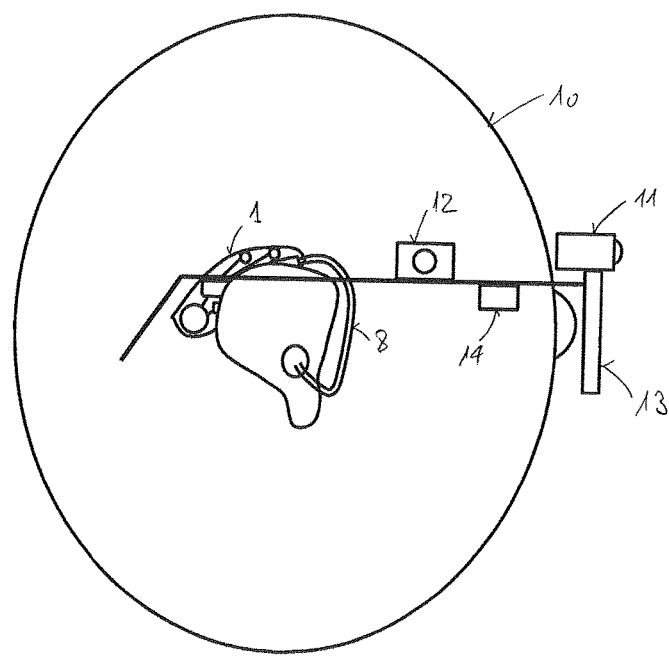

FIG. 2 shows a side view of a head 10 of a hearing device user wearing the hearing device 1 of FIG. 1. Besides the internal components of the hearing device 1 a sound tube 8 is also shown that is connected to an ear piece (not shown in FIG. 2) arranged in the ear of the hearing device user. As can be seen from FIG. 2, the hearing device user is wearing glasses 13 to which a front camera 11 and a side camera 12 are attached. Furthermore, a sensor unit 14 is also attached to the glasses 13, the sensor unit 14 being a microphone or a compass, for example.

Figure 4:
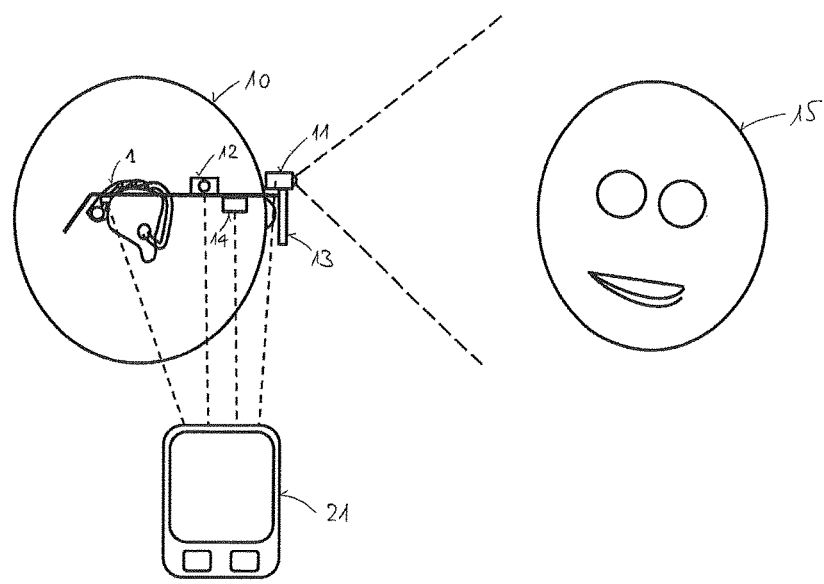
Figure 5A:
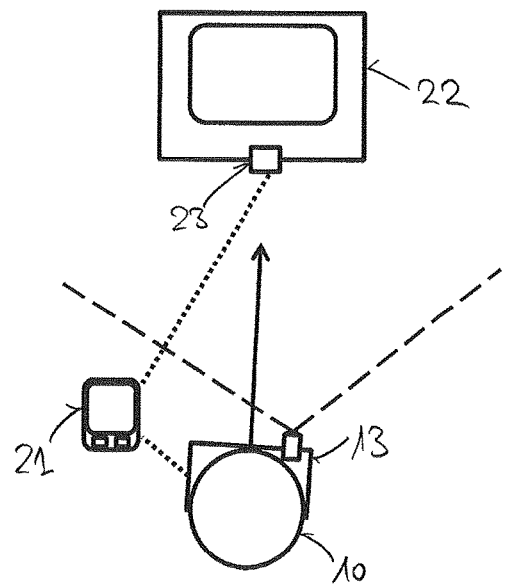
Figure 5B:
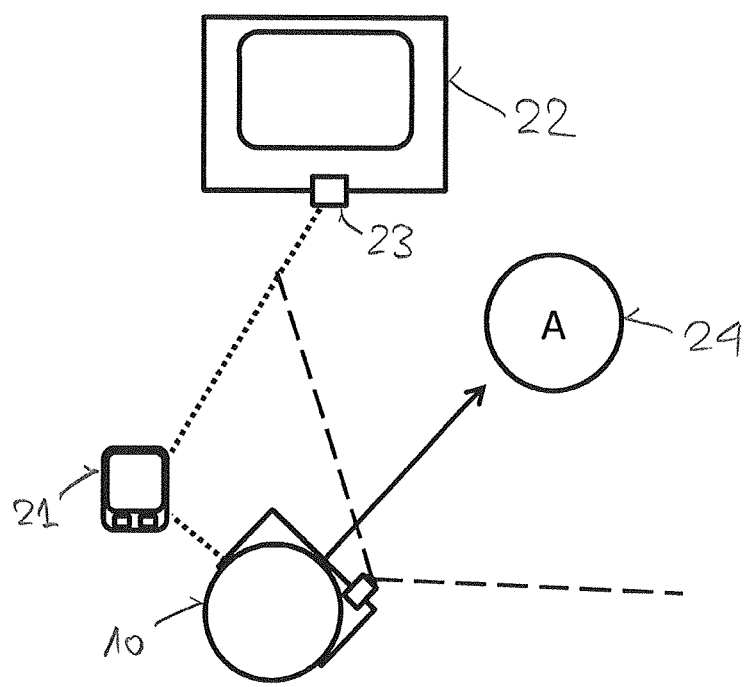

The cameras 11, 12 and the sensor unit 14 generate output signals that must be processed, for example by applying a tracking algorithm for tracking a person being of interest for the hearing device user. As a matter of fact, such a processing is rather intense and asks for a rather powerful processor. Because the hearing device 1 typically has limited processing power and limited battery capacity, the processing of the output signals of cameras 11, 12 and the sensor unit 14 are processed in an auxiliary device 21 (FIGS. 4, 5a and 5b). Thereto, the cameras 11, 12 and the sensor unit 14 are connected to said auxiliary device 21, which can be a smartphone or a remote control having ample processing power available. Therefore, the cameras 11 and 12 transmit its raw data to the auxiliary device 21, in which the raw data is processed according to the envisaged task. In fact, by applying the envisaged tasks, e.g. the tracking algorithm to track a person being important to the hearing device user, consolidated data is generated from the raw data by the auxiliary device 21. These consolidated data are taken into account in the hearing device 1, i.e. in the processing unit 3, while generating the output signal of the hearing device 1 by processing the audio signal.

The consolidated data can be, for example, an angle or a direction towards a person being important for the hearing device user. The angle is updated on a regular basis in order that said person can be tracked without delay.

The tracking algorithms run on a powerful processor of the auxiliary device 21. The result (i.e. an angle) is transmitted to the hearing device 1 via a wireless connection, for example.

Since the consolidated data is small in comparison to the raw data (e.g. an image or a sequence of images), taking into account the consolidated data in the processing unit 3 of the hearing device 1 only results in a low battery load.

The sensor unit 14 attached to the glasses 13 (as shown in FIG. 2) or attached to the auxiliary device 21 is used, in a further embodiment of the present invention, to enhance robustness of the algorithms being implemented. If a tracking algorithm is implemented, the auxiliary device 21 may very well be used to initialize the tracking of a person being important to the hearing device user. This can be achieved by pressing a bottom on the auxiliary device 21 while pointing to said person at the same time.

It has already been described that some embodiments of the present invention comprise more than one camera 11, 12.

While the first or main camera 11 is pointing to the front, further cameras may be attached at the side of the head of the hearing device user. Preferably the cameras 11, 12 are attached on the glasses 13 (as shown in FIG. 2), or on the hearing device 1 (not shown). However, it is important that the cameras 11, 12 move with the head of the hearing device user to detect the angle between a sagittal plane of said user and the person (speaker) being important for the hearing device user.

In a further embodiment, at least one of the cameras 11, 12 is a TOF-(Time-of-Flight) camera, such as used in "Microsoft Kinect" or in a smartphone. It is noted that the smartphone may also comprise two cameras that might be used according to the present invention.

In case that the hearing device 1 is not mechanically coupled to the head of the hearing device user, it is necessary to detect a head movement of the hearing device user in order to track said person being important for the hearing device user (e.g. a speaker). Such an information could be derived from a further sensor in the hearing device 1, such further sensor being a camera looking at the head of the hearing device user, for example.

A synchronization of the acoustic detection of speech pauses of the person being important for the hearing device user (speaker or target person) with the visual detection of the conversation activity of the target person (e.g. by detecting whether said person is talking or is silent) by analysing an image taken by the camera, makes the tracking algorithm more robust and may help for a fast adaptation to conversational turns (e.g. changing the target person) by visual detecting speech pauses of the target person in continuous manner. In a further embodiment of the present invention, the microphone of the auxiliary device (e.g. smartphone) may be used for such a detection.

Figure 3A:
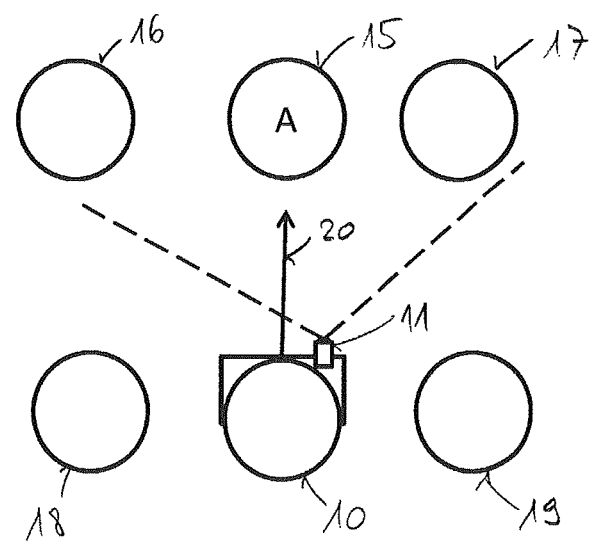
FIG. 3a and FIG. 3b show two situations a hearing device user may encounter, FIG. 4 schematically shows the hearing system with an auxiliary device, and FIG. 5a and FIG. 5b schematically shows a situation with the user of the hearing device, with the auxiliary device and a person being of interest for the hearing device user.
Figure 3B:
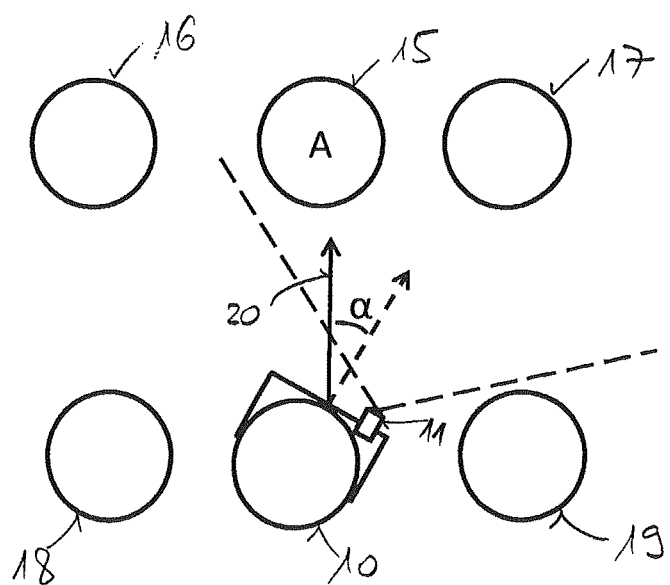

FIGS. 3a and 3b schematically show top views of the hearing device user 10 among a number of people 15 to 19 surrounding said user 10. The hearing device user 10 wears the hearing device 1 illustrated in and described in connection with FIG. 2.

In the situation depicted in FIGS. 3a and 3b, it is assumed that the hearing device user 10 is interested in listening to what the speaker A (person 15) says. In order that the hearing system according to the present invention is able to track speaker A, the hearing device user 10 must enable tracking of speaker A. Thereto, an initial sign indicating speaker A must be given to the hearing system in order that the hearing system may track speaker A.

In FIG. 3a, a situation is depicted in which the hearing device user 10 initializes a tracking of speaker A. Such an initialization can be done, for example, by pointing with the camera 11 to the speaker A, i.e. the hearing device user 10 looks to the speaker A. In case the camera 11 is not fixed to the head of the hearing device user 10, an orientation of the camera relative to the head of the user 10 needs to be known. For this purpose a compass comprised in the hearing device 1 may be used. In further embodiments, similar orientation signals, e.g. a compass signal form the auxiliary device 21 or of a further camera can be used.

Once the hearing device user 10 decides to start tracking speaker A, one of the following initialization procedures may be performed:
  A button on the auxiliary device 21 is pressed.
  Instead of pressing a button, any other input method may be used, such as, for example, a voice command.
  If the hearing system incorporates acceleration sensors, a specific head movement by the hearing device user 10—like a head tilt with a specific angle—can be detected.
  If the hearing system incorporates an eye-tracking system, the hearing device user 10 may look into different directions with a specific directional pattern that is detected to start tracking speaker A. Alternatively, twinkling with the eyes may be also detected to start tracking speaker A.

In a further embodiment, the hearing system according to the present invention comprises face recognition capabilities and comprises a database of faces of known speakers (favorites). In such an embodiment, the initialization of tracking a speaker may be done by a voice command, such as "listen to Lisa". The system would then try to find the face of Lisa. Once the face of Lisa has been identified, Lisa is defined as the sound source being most important to the hearing device user 10 and therefore is tracked. A person that is selected to be tracked but is not in the database could be added to the database, if a proper snapshot of the face of this person can be taken during a conversation.

Disabling tracking may work similar as enabling tracking. In addition, situation specific actions can disable tracking a speaker, like:
  Speaker A stops talking for a certain while.
  Speaker A or the hearing device user leaves the scenery (e.g. speaker A appears smaller in the captured sequence of images or disappears from the images).
  No signal coming from the speaker A for a predefined time.

According to the present invention, a number of possible criterions are being implemented for tracking a person being important for the hearing device user. One criterion might be typical characteristics of a face of a person to be tracked, whereas these face characteristics are memorized and used with image processing methods for face recognition. In general, recognizing the presence of a face and tracking the movement of this face, whereas such an algorithm may be enhanced by
  detecting the acoustic direction of any incoming signal/voice, assuming that it is the voice of the tracked person;
  the synchronization of the acoustic onsets and offsets of any signal/speech signal (originating from the same direction) with the movement of the mouth or head captured with the camera;
  capturing acoustic properties of the voice of the speaker during the enabling process (according to speaker recognition algorithms) and comparing this signal with the video analysis (e.g. moving source and/or face recognition and/or movement of the mouth) (synchronization of speech pauses or/and directionality of the source);
  in case the hearing device user wears any movement sensors on the head, any head movements can be incorporated in the calculation of the angle between the speaker and the hearing device user. In case the angle between the body of the speaker and the body of the hearing device user are the same, the tracking of the head movement of the hearing device user is sufficient to calculate the wanted angle.
  matching characteristics of the face with characteristics of the voice (e.g. low pitch of the voice and male characteristics in the face).
  matching size of the face and acoustic distance of the speech (if possible, signal processing optimizes for distant speech as well, e.g. mixing between streaming-microphone mode toward more percentage of the streaming signal).

FIG. 4 shows the hearing device user 10 wearing a hearing device 1 and glasses 13 as depicted in FIG. 2 as well as a person 15 being important for the hearing device user 10. In addition, the auxiliary device 21 is also shown in FIG. 4 being linked to the cameras 11 and 12, the sensor unit 14 and the hearing device 1 via a wireless link being proprietary or a standardized link, e.g. Bluetooth or the like. As has been already mentioned, processing of image or sequences of images are processed in the auxiliary device 21 by generating consolidated data (e.g. an angle α being defined between a sagittal plane of the hearing device user 10 and the person 15 being important for the hearing device user 10. Only the consolidated data are then transmitted to the hearing device 1, where it is taken into account while processing the signal or signals of the input transducers 5, 6.

It is pointed out that a sound source being important for the hearing device user is not always a speaker as it is described in connection with FIGS. 3a and 3b. A sound source being important for the hearing device user 10 may very well also be an audio source from a Radio or TV set, for example.

FIGS. 5a and 5b show two situations with an alternative sound source 22 being of interest to the hearing device user 10, the situation depicted in FIG. 5b being a mixture of the alternative sound source 22 and a speaker A (reference sign 24).

In FIG. 5a, the hearing device user 10 wearing glasses 13, as explained in connection with FIG. 2, is positioned before a TV set 22 comprising a wireless interface unit 23 for streaming the audio signal of the TV set 22 via the auxiliary device 21 to the hearing device. As a matter of fact, an audio signal that is emitted by the loudspeaker of the TV set 23 and picked up by an input transducer 5, 6 (FIG. 1) of the hearing device 1 is replaced by the audio signal of the TV set 23 being streamed via the wireless interface unit 23. Therewith, the quality of the signal received for processing in the hearing device 1 is higher than for a signal picked up by the input transducers 5, 6 as these input transducers 5, 6 also pick up noise and surrounding sounds.

In other words, if the loudspeakers of the TV set 23 comprises streaming means, the signals picked up by the input transducers 5, 6 can automatically be substituted by the streamed audio signal. It is pointed out that any device may be upgraded to include streaming means. In particular, a remote microphone may comprise streaming means in order to transmit the picked-up sound directly to its destination or processing unit.

The presence of streaming means may be recognized by using the camera of the auxiliary device 21. The camera detects the TV set 23 or may recognize that a speaker is using a remote microphone comprising streaming means. At the same time, the auxiliary device 21 may scan available audio-streams. In case a hearing device user wants to track such a sound source having streaming means, the user may connects his auxiliary device 21 to an audio stream coming from the corresponding sound source. The auxiliary device 21 may than act as a relay station between the streaming device and the hearing device. Alternatively, a direct streaming from the streaming device to the hearing device is possible.

The invention claimed is:

1. A method for operating a hearing system comprising a hearing device (1), a camera (11, 12) and an auxiliary device (21), the method comprising the steps of:
providing an input signal for said hearing device (1),
capturing an image or a sequence of images of at least sections of a surrounding of a user (10) wearing said hearing device (1),
processing said image or said sequence of images in said auxiliary device (21) for obtaining consolidated data of a sound source (15, 22) being important for said user (10), wherein said consolidated data of the sound source (15, 22) comprises a directional angle ($\alpha$) being defined between a sagittal plane of said user (10) and said sound source (15, 22) seen from said user (10),
locating said sound source (15, 22),
tracking said sound source (15, 22),
updating said angle ($\alpha$) of said source (15, 22) being tracked,
transmitting said consolidated data to the hearing device (1),
generating an output signal in said hearing device (1) by processing the input signal and by taking into account said consolidated data, and
feeding said output signal to an output transducer of said hearing device (1).

2. The method of claim 1, further comprising the steps of:
selecting said sound source (15, 22) being important to said user (10) of said hearing device (1) out of a plurality of sound sources (15, . . . , 19; 22; 24), and
tagging said sound source (15, 22) by activating an input on the auxiliary device (21).

3. The method of claim 1, wherein the auxiliary device (21) is one of the following:
a smartphone;
a remote control.

4. The method of claim 1, wherein said camera (11, 12) is positioned at the head of the user (10).

5. The method of claim 1, further comprising the step of augmenting said consolidated data by information of a sensor unit (14).

6. The method of claim 5, wherein the sensor unit is a compass or an additional microphone signal.

7. The method of claim 1, wherein said input signal to the hearing device (1) originate from at least one input transducer (5, 6) or from a streaming unit (23).

8. A method for operating a hearing system comprising a hearing device (1), a camera (11, 12) and an auxiliary device (21), the method comprising the steps of:
providing an input signal for said hearing device (1),
capturing an image or a sequence of images of at least sections of a surrounding of a user (10) wearing said hearing device (1),
processing said image or said sequence of images in said auxiliary device (21) for obtaining consolidated data of a sound source (15, 22) being important for said user (10),
transmitting said consolidated data to the hearing device (1),
generating an output signal in said hearing device (1) by processing the input signal and by taking into account said consolidated data,
feeding said output signal to an output transducer of said hearing device (1),
detecting a present position of said user (10) relative to the camera (11, 12), and
calculating a direction ($\alpha$) in which said sound source (15, 22) being important for said user (10) is allocated, taking into account the present position of said user (10).

9. A method for operating a hearing system comprising a hearing device (1), a camera (11, 12) and an auxiliary device (21), the method comprising the steps of:
providing an input signal for said hearing device (1),
capturing an image or a sequence of images of at least sections of a surrounding of a user (10) wearing said hearing device (1),
processing said image or said sequence of images in said auxiliary device (21) for obtaining consolidated data of a sound source (15, 22) being important for said user (10),
transmitting said consolidated data to the hearing device (1),
generating an output signal in said hearing device (1) by processing the input signal and by taking into account said consolidated data, feeding said output signal to an output transducer of said hearing device (1), detecting a favorite speaker as said sound source (10) by face recognition and comparison to a corresponding data base, and tracking said favorite speaker after a tracking command is received by said auxiliary device (21).

10. A hearing system comprising:

a hearing device (1) comprising an input transducer (5, 6), an output transducer (7) and a processing unit (3) being operatively connected to the input transducer (5, 6) and the output transducer (7), at least one camera (11, 12) for capturing an image or a sequence of images of at least a section of a surrounding of a user (10) wearing said hearing device (1), an auxiliary device (21) receiving and processing said image or said sequence of images for obtaining consolidated data of a sound source (15; 24) being important for said user (10), wherein said consolidated data of the sound source (15, 22) comprises a directional angle (α) being defined between a sagittal plane of said user (10) and said sound source (15, 22) seen from said user (10), wherein said auxiliary device (21) being adapted to locate said sound source (15, 22), to track said sound source (15, 22) and to update said angle (α) of said sound source (15, 22) being tracked and a transmission channel between said auxiliary device (21) and said hearing device (10) for transmitting said consolidated data to said hearing device (1), wherein said processing unit (3) is adapted to take into account said consolidated data while generating an output signal for the output transducer (7).

11. The hearing system of claim 10, wherein a low power technology is used for the transmission channel.

12. The hearing system of claim 11, wherein the low power technology includes Bluetooth standard or inductive coupling.

13. The hearing system of claim 10, wherein the transmission channel is adapted to continuously transmit consolidated data from the auxiliary device (21) to the hearing device (1).

14. The hearing system of claim 10, wherein the auxiliary device (21) is a smartphone or a remote control.

* * * * *